United States Patent [19]

Matsukawa

[11] Patent Number: 5,773,940
[45] Date of Patent: Jun. 30, 1998

[54] POWER DRIVE DEVICE

[75] Inventor: Nobuo Matsukawa, Tokyo, Japan

[73] Assignee: Nikon Corporation, Tokyo, Japan

[21] Appl. No.: 552,780

[22] Filed: Nov. 3, 1995

[30] Foreign Application Priority Data

Nov. 11, 1994 [JP] Japan .................................. 6-303003

[51] Int. Cl.$^6$ .............................. G03B 1/00; H02P 1/54; G05B 11/32
[52] U.S. Cl. ............................. 318/59; 318/60; 318/625; 318/597; 318/599; 396/396; 396/406; 396/410
[58] Field of Search ................................... 396/406, 409, 396/410, 396; 318/280–282, 59, 60, 62, 625, 596, 597, 599

[56] References Cited

U.S. PATENT DOCUMENTS

| 4,371,244 | 2/1983 | Daitoku et al. . |
| 4,579,435 | 4/1986 | Haraguchi . |
| 4,958,175 | 9/1990 | Asakura et al. . |
| 5,094,116 | 3/1992 | Shintani ..................................... 74/354 |
| 5,543,878 | 8/1996 | Murakami . |

FOREIGN PATENT DOCUMENTS

A-60-79338  5/1985  Japan .

*Primary Examiner*—Brian Sircus
*Attorney, Agent, or Firm*—Oliff & Berridge, PLC

[57] ABSTRACT

A power drive device is disclosed that includes a motor, a control device coupled to the motor, and a rotatable reference axle member rotatably interlocked with the rotation of the motor. A first detection member detects a first phase and a third phase of rotation of the reference axle member wherein the first phase corresponds to a rotation starting position of the reference axle member and the third phase corresponds to a near completion position of the reference axle member. The device also includes a second detection member that detects a second phase and a fourth phase of rotation of the reference axle member, wherein the fourth phase of rotation corresponds to a rotation completion position of the reference axle member. The control device drives the motor in accordance with the detected phases of the first and second detection members, and in particular, can control the velocity of the motor and the timing of the operation of the motor in relation to a second motor. The power drive device may be used in a camera to wind film and charge various mechanisms of the camera, such as a shutter.

20 Claims, 10 Drawing Sheets

POWER DRIVE DEVICE

BACKGROUND

1. Field of the Invention

The present invention relates to a power drive device, and in particular, to a drive device for a film winding device, shutter charge device, and the like.

2. Background of the Related Art

Power film winding devices for cameras are well known. Such devices generally include a sprocket having a film winding restriction device and a detector that interlocks with a film winding completion phase detection device. Film movement is stopped by mechanically stopping the sprocket upon completion of winding of one film frame and simultaneously applying a brake on the film winding motor. See, for example, Japanese Unexamined Patent Publication Sho 60-79338.

A power winding device is also known which includes a phase detection device that emits phase detection signals used to control the speed of the film winding motor. This device does not include the aforementioned mechanical film winding restriction device.

In the first-mentioned power winding device, the sprocket mechanically engages and stops the film at a precise position. However, this device is costly and requires a relatively large space. This is because, in addition to the restriction device, a mechanism is needed to release the restriction device to rewind the film. Moreover, because the film is stopped mechanically by engaging the gears of the sprocket, tearing at the perforation of the film during high speed winding often occurs when temperatures are low.

In the second-mentioned power winding device, mechanical parts to engage and stop the film are not needed. This provides the advantages of cost and space savings over the first-mentioned winding device. However, it is difficult to stop the film at a precise position. Moreover, if a manual rewinding device is provided, erroneous use of the manual rewinding device may result in undesirable slack of the film since the movement of the film is not sufficiently mechanically restricted.

In a camera in which charging of the shutter and other mechanisms and winding of the film are accomplished by separate motors and in which a mechanical restriction device is provided for film winding, a method is known wherein the restriction on film winding is released using power from the mechanism charge motor. In this case, control of the film winding motor is accomplished by starting the motor upon the release of the winding restriction and by stopping the motor upon detection of completion of film winding. The film winding restriction is released upon the start of the mechanism charge motor. Consequently, both motors are driven simultaneously which increases the load on the battery.

There is also known a method in which the restriction on film winding is controlled by using an electromagnetic force mechanism, such as a solenoid. However, energization of the solenoid for each film frame causes the battery to wear out quickly. Moreover, impacts on the camera may cause the heavy weight of the iron core of the solenoid to move and thus release the restriction. When this occurs, one frame of unexposed film would need to be wound. Consequently, film is wasted.

In order to overcome the problems described above, the present invention aims to prevent film tears during low temperatures, avoid erroneous operations due to impacts, save space, reduce cost, and reduce wear on the battery.

SUMMARY OF THE INVENTION

In order to achieve the above and other objects of the invention, the power drive device in accordance with a first embodiment of the invention includes a motor, a control device coupled to the motor, and a rotatable reference axle member rotatably interlocked with the rotation of the motor. A first detection member is provided for detecting a first phase and a third phase of rotation of the reference axle member, wherein the first phase corresponds to a rotation starting position of the reference axle member and the third phase corresponds to a near completion position of the reference axle member. A second detection member is also provided for detecting a second phase and a fourth phase of rotation of the reference axle member, wherein the fourth phase of rotation corresponds to a rotation completion position of the reference axle member. The control device drives the motor in accordance with the detected phases of the first and second detection members.

In accordance with another embodiment of the invention, the control device drives the motor with a first velocity during the time period between the detection of the first and third phases and drives the motor with a second velocity during the time period between the detection of the third and fourth phases.

In accordance with a still further embodiment of the invention, the power drive device includes a second motor and a mode selector that selects between a first mode in which both of the motors are driven substantially simultaneously and a second mode in which the first-mentioned motor is driven substantially when the second motor is stopped. The control device drives the first-mentioned motor continuously during the time period between the first and fourth phases if the first mode is selected. Further, if the second mode is selected, the control device drives the first-mentioned motor during the time period between the detection of the first and second phases and then stops the first-mentioned motor for a predetermined period of time and then resumes driving of the first-mentioned motor until the detection of the fourth phase.

BRIEF DESCRIPTION OF THE DRAWINGS

This invention will be described in detail with reference to the following drawings in which like reference numerals refer to like elements and wherein.

DETAILED DESCRIPTION OF A PREFERRED EMBODIMENT

Figure 1:
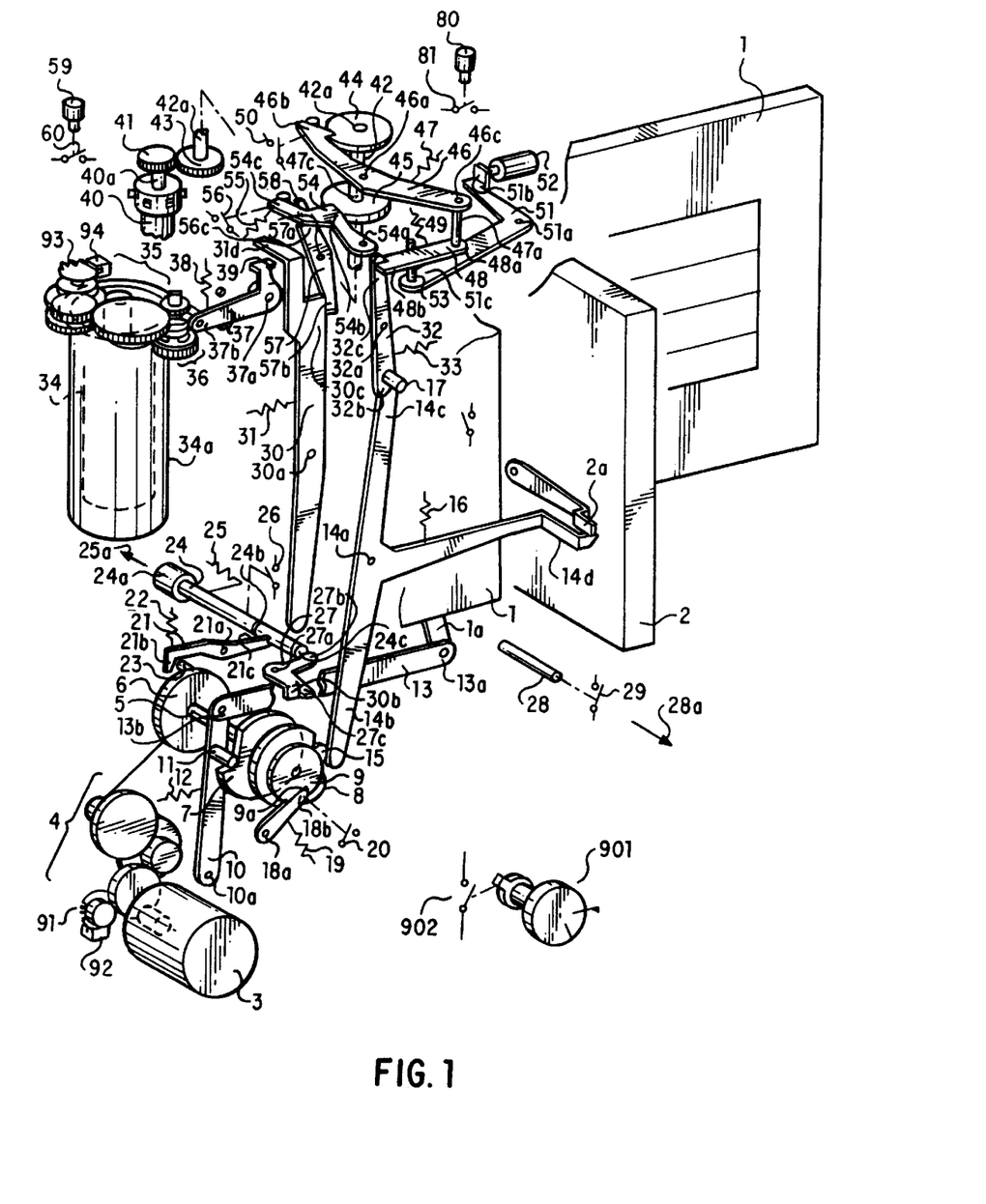
FIG. 1 is an oblique view of an embodiment of the power drive device according to an embodiment of the present invention.

FIG. 1 is an oblique view of a power drive device according to an embodiment of the present invention, and in particular, to an embodiment describing a film winding unit and a mechanism charge unit.

A shutter 1 including a charge lever 1a and a mirror drive/diaphragm control device 2 (hereafter mirror system 2) including a charge lever 2a are well known structures and include conventional electromagnetic control systems (not shown). Power from a first motor 3 is transmitted to a cam axle 5 through a speed reducer 4. A gear 6, shutter charge cam 7, mirror system cam 8, and cam axle phase detection plate 9 are anchored on the cam axle 5. The cam axle phase detection plate 9 has a notch 9a on its circumference. Charging of the shutter 1 and the mirror system 2 is accomplished by rotation of the cam axle 5.

A shutter charge lever 10 is axle-supported by a bearing 10a to rotate freely and includes a roller 11 attached thereon. The shutter charge lever 10 is energized clockwise by an energizing member 12, such as a spring. A connection lever 13 is connected to the charge lever 1a at one end 13a thereof and to the shutter charge lever 10 at an opposite end 13b. A mirror system charge lever 14 is axle-supported at the bearing unit 14a to rotate freely and has a roller 15 anchored thereto at the end portion 14b. The mirror system charge lever 14 is energized clockwise by an energizing member 16 and also includes an arm 14d engaged with the charge lever 2a. A roller 17 for engaging a lever 32 is anchored on the end of the arm 14c.

A detection lever 18 is axle-supported by a bearing unit 18a to rotate freely and is energized counterclockwise by an energizing member 19. An end 18b of the detection lever 18 contacts the cam axle phase detection plate 9. A switch 20 is linked to the detection lever 18 such that rotation of the detection lever actuates the switch.

An engagement lever 21 is axle-supported by a bearing unit 21a to rotate freely and is energized counterclockwise by an energizing member 22. An end 21b of the lever 21 is capable of engaging with a pin 23 anchored on the gear 6. The other end 21c of the lever 21 contacts an axle 24. The axle 24 is capable of moving along its axis and is energized by an energizing member 25 in a direction 25a. A groove 24b is provided in the middle of the axle 24 and a push operation unit 24a is positioned on an end of the axle 24. The other end 24c of the axle 24 is capable of contacting a lever 27.

A switch 26 is linked to the axle 24 such that movement of the axle actuates the switch. A lever 27 is axle-supported by the bearing unit 27a to rotate freely and has an end 27c capable of engaging an end 30b of a lever 30. A film detection pin 28 is capable of moving along its axis and is pushed in the direction 28a by the film (not shown) when the film is loaded. A switch 29 is linked to the film detection pin 28 such that movement of the pin actuates the switch. The lever 30 is axle-supported by the bearing unit 30a to rotate freely and is energized counterclockwise by an energizing member 31. A shoulder portion 30c of the lever 30 engages with a lever 57. A lever 32 is axle-supported by a bearing unit 32a to rotate freely and is energized counterclockwise by an energizing member 33. The lower end 32b of the lever 32 engages with the roller 17 while the upper end 32c engages with a lever 48.

Power from a second motor 34 is transmitted to a spool 34a through a speed reducer 35 and a clutch gear 36. FIG. 1 describes a condition in which the speed reducer 35 and the spool 34a are connected. A clutch lever 37 is axle-supported by a bearing unit 37a to rotate freely and is energized counterclockwise by an energizing member 38. A spring 39 is provided to absorb over-stroke and engages with the upper end 31d of the lever 31. An end 37b of the clutch lever 37 engages with the clutch gear 36.

A gear 41 is anchored on a top portion 40a of a sprocket 40 having, for example, six teeth. A gear 43, control plate 44, and completion detection plate 45 are respectively anchored on a bottom portion 42a, top portion 42b, and middle portion 42c of a reference axle 42. The control plate 44 and the completion detection plate 45 will be explained in detail later. A control lever 46 is axle-supported by a bearing unit 46b to rotate freely and is energized clockwise by an energizing member 47. A key 46b engages the control plate 44. A pin 47a is mounted on an end 46c of the control lever and to a lever 48. The lever 48 is axle-supported by a bearing unit 48a to rotate freely and is energized clockwise by an energizing member 49. An end 48b of the lever 48 engages the lever 32.

A switch 50 is linked to the lever 46 such that movement of the lever actuates the switch. A lever 51 is axle-supported by a bearing unit 51a and has an end 51b in engagement with a solenoid 52. A pin 53 is mounted on the other end 51c of the lever 51 and engages the lever 48. A lever 54 is axle-supported by a bearing unit 54a to rotate freely and is energized clockwise by an energizing member 55. A key 54b engages the completion detection plate 45, and an end 54c engages an end 57c of a lever 57. A switch 56 is linked to the lever 54 such that movement of the lever 54 actuates the switch.

Figure 3A:
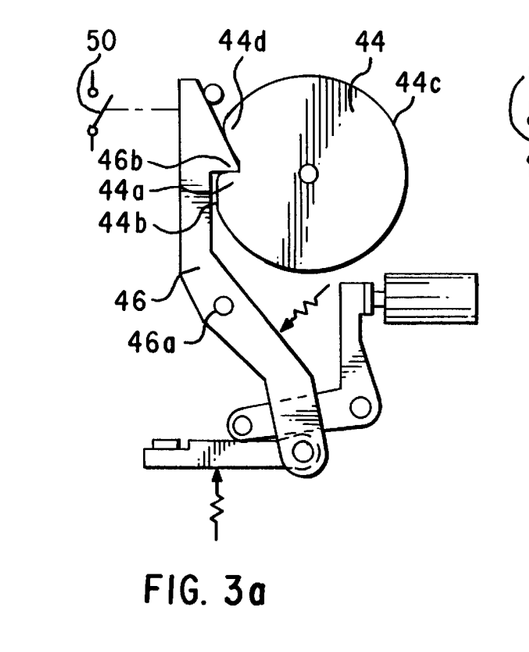
FIGS. 3(a)–(b) are schematic views of the first and second detection members in an initial state.
Figure 3B:
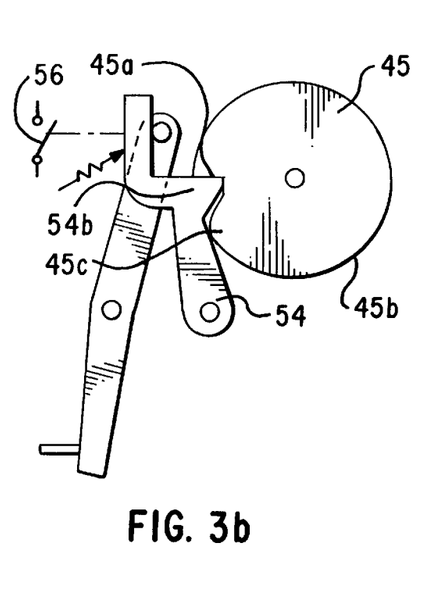
Figures 4A, 4B:
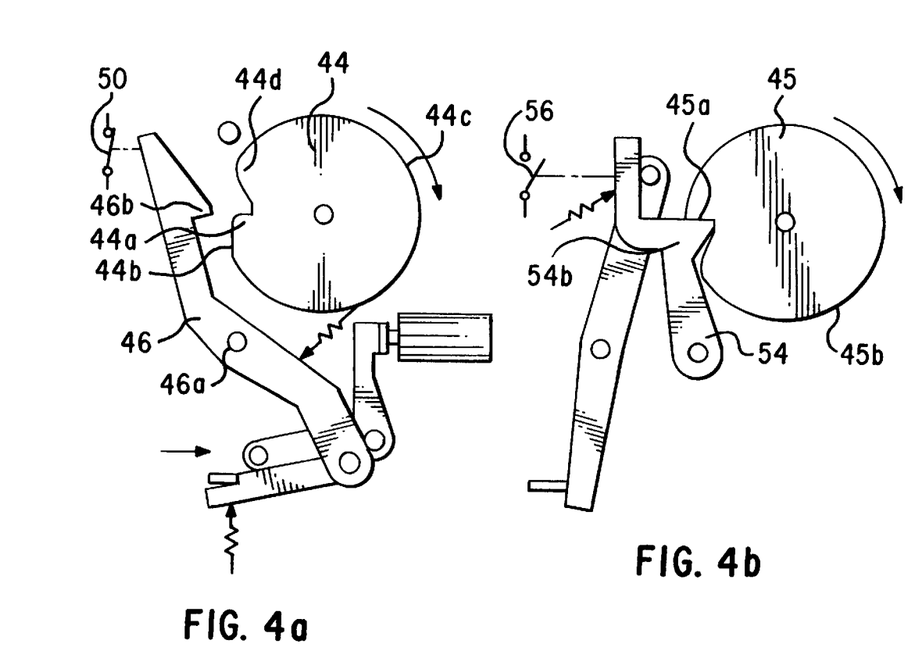
FIGS. 4(a)–(b) are schematic views of the first and second detection members during a stage of operation.
Figure 5A:
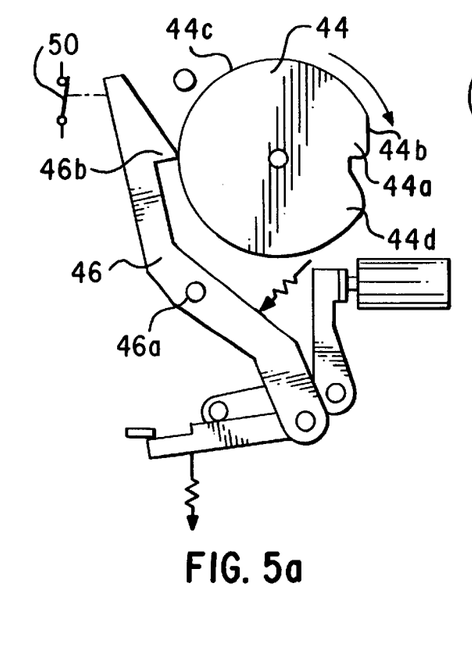
FIGS. 5(a)–(b) are schematic views of the first and second detection members during a further stage of operation.
Figure 5B:
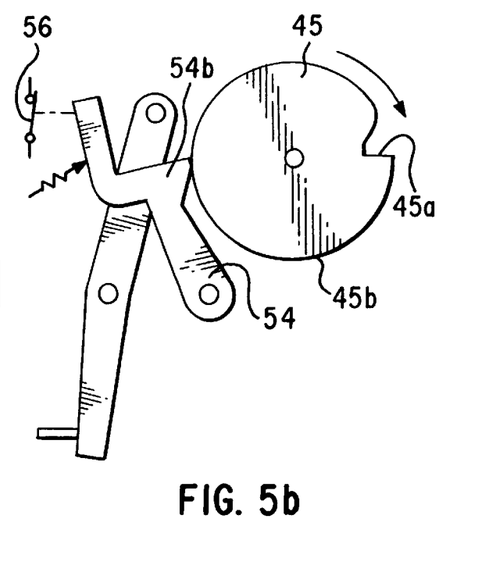

Next, the control plate 44 and the completion detection plate 45 will be explained with reference to FIGS. 3(a)–3(b). In these figures, the control plate 44 and the completion detection plate 45 are drawn side-by-side for ease of understanding though in actuality they are positioned coaxially.

The control plate comprises a stop 44a, a slant surface 44b, a circumference section 44c having a maximum radius of the control plate, and a cam portion 44d. The switch 50 is off in FIG. 3(a) and turns on when a key 46b climbs over the slant surface 44b. The circumference 45b of the completion detection plate 45 includes a notch 45a. A switch 56 is off in FIG. 3(b) and turns on when a key 54b climbs over a surface 45c of the notch.

Returning to FIG. 1, the lever 57 is axle-supported by the bearing unit 57a with the end 57b engaging the lever 31 and having a pin 58 mounted on the other end 57c. The pin 58 engages the end 54c of the lever 54. A multiple exposure push button 59 is linked to a switch 60 so as to actuate the switch through movement of the push button. A preview push button 80 is linked to a switch 81 so as to actuate the switch with movement of the preview button.

Figure 2:
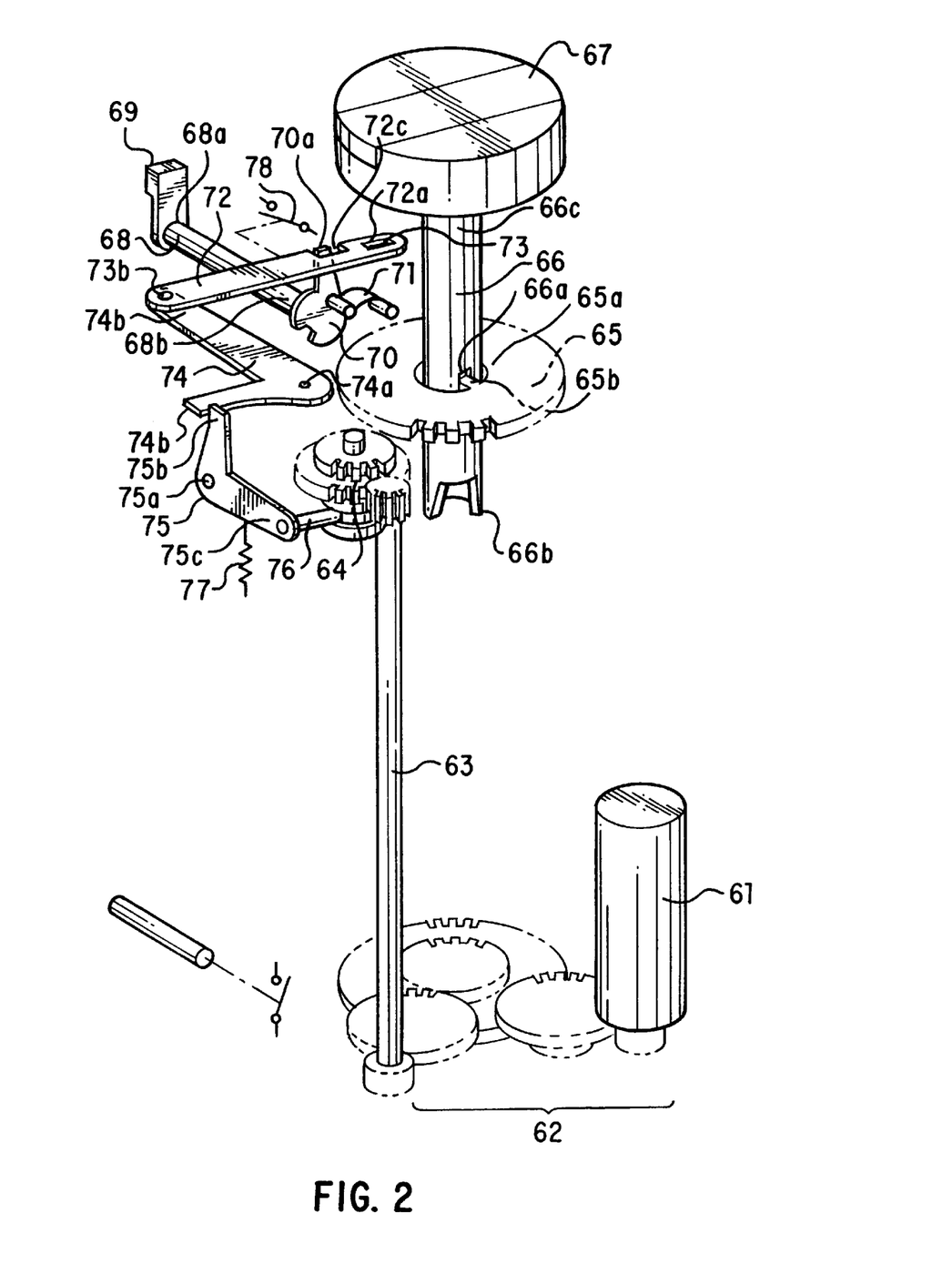
FIG. 2 is an oblique view of a rewinding device used with the power drive device of FIG. 1.

FIG. 2 is an oblique view of a rewinding mechanism used with the device of FIG. 1.

In FIG. 2, power from a third motor 61 is transmitted to a gear 65 through a speed reducer 62, transmission axle 63, and clutch gear 64. A rewinding axle 66 is inserted in an opening 65a of a gear 65, and a key 65b engages with a key groove 66a. A bottom portion 66b of the rewinding axle 66 is fork-shaped and engages with a film chamber (not shown). A rewinding operation member 67 for manual rewinding is provided on a top portion 66c of the rewinding axle. An operation lever axle 68 is axle-supported to rotate freely and includes a first end 68a secured to an operation lever 69, and a second end 68b secured to a lever 70. A toggle spring 71 is attached on the lever 70 to positionally maintained the lever. The lever 70 may be rotated clockwise by a specified angle.

A guide opening 72a of a lever 72 is guided by a pin 73, and an end 73b is axle-supported by an end 74b of a lever 74 to rotate freely. The groove 72c engages with an arm 70a of the lever 70. The lever 74 is axle-supported by the bearing unit 74a to rotate freely, and the end 74b engages the end 75b of a lever 75. The lever 75 is axle-supported by a bearing unit 75a to rotate freely, and a pin 76 is anchored on the end 75c of the lever 75. The lever 75 is energized counterclockwise by an energizing member 77. The pin 76 engages with the clutch gear 64. A switch 78 is actuated by movement of the lever 72 to which it is interlocked.

A sector gear 91 is rotationally interlocked with the speed reducer 4 and generates a first pulse by a photo-interrupter 92. The sector gear 93 is rotationally interlocked with the speed reducer 35 and generates a second pulse by a photo-interrupter 94.

Next, the operation of the power drive device according to an embodiment of the invention is explained.

FIG. 1 describes a condition wherein film winding, charging of the shutter, and shooting preparation are completed. In the present embodiment, a mode selecting device is provided for selecting between a first mode, wherein charging of the shutter and film winding are executed simultaneously, and a second mode, wherein film winding is executed after completion of charging of the shutter. The mode selecting device may comprise, for example, a manually operable mode set-up dial 901 operably linked to an ON-OFF switch 902.

Figure 11:
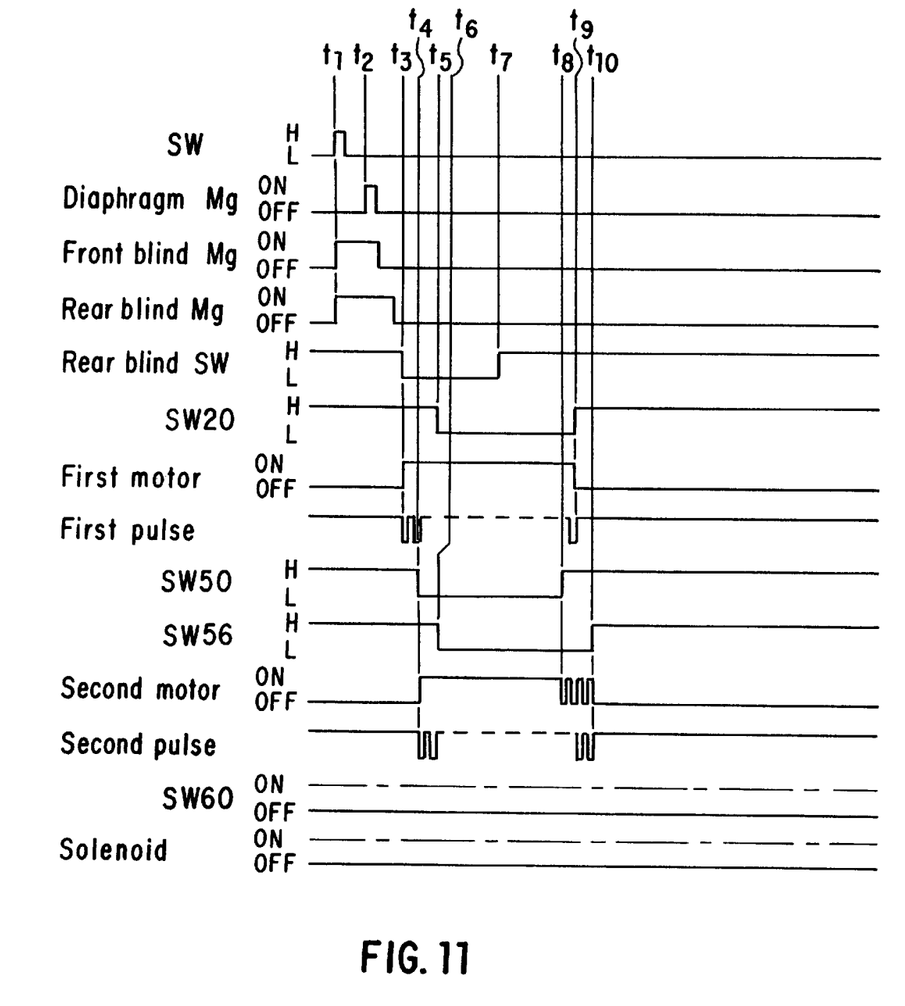
FIG. 11 is a timing chart describing a first mode of operation of the embodiment of FIG. 1.

The first mode will be explained with reference to FIGS. 12, FIGS. 4(a)–6(b), and FIG. 11. In FIG. 11, H represents the off-condition and L represents the on-condition of each switch.

When a release operation is started (time t1 in FIG. 11), the mirror-up and diaphragm drive operations begin, and electric current flows to the magnets of the front and rear blinds of the shutter. When the diaphragm is closed to a predetermined diaphragm value, a diaphragm magnet is turned on (time t2) and the shutter operation continues. Upon completion of the shutter operation (time t3), the shutter rear blind switch turns on which activates the first motor 3.

The first motor 3 rotates the cam axle 5, via the speed reducer 4, counterclockwise. With rotation of the cam axle 5, the shutter charge lever 10 is driven, and charging of the shutter 1 begins. Simultaneously, the mirror system charge lever 14 is driven, and charging of the mirror system 2 is started. Immediately after the start of rotation of the cam axle 5, the detection lever 18 is pushed out of the notch 9a of the cam axle phase detection plate 9 and turns the switch 20 on (time t5). With further rotation of the cam axle 5, the shutter rear blind switch turns off (time t7). Upon completion of one revolution, the detection lever 18 again falls in the notch 9a in the phase detection plate 9 and switch 20 turns off (time t9). Upon detection that switch 20 is turned off, the first motor is stopped by application of short circuit control.

The rotation of the mirror charge lever 14 causes rotation of the lever 32 clockwise through contact with the roller 17. The lever 32 drives the lever 48 towards the right with respect to FIG. 1, causing counterclockwise rotation of the lever 46. This releases the mechanical engagement between the key 46b and the control plate 44, as described in FIG. 4(a), which turns the switch 50 on (time t4) causing the second motor 34 to rotate.

The motor 34 is driven full speed by direct current. The motor 34 rotates the spool 34a via the speed reducer 35 and the clutch gear 36. This in turn causes winding of the film (unrepresented) and counterclockwise rotation of the sprocket 40. The gear 43 moves with the movement of the film, causing clockwise rotation of the reference axle 42. With rotation of the reference axle 42, the key 54b of the lever 54 climbs onto the circumference 45b of the completion detection plate 45 which turns the switch 56 on as described in FIG. 5(b).

Figure 6A:
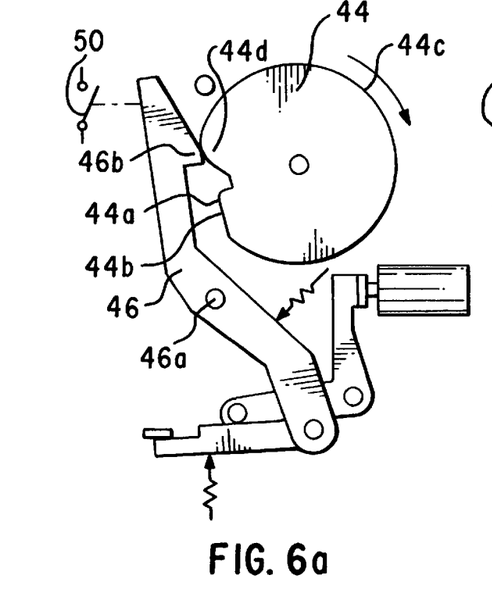
FIGS. 6(a)–(b) are schematic views of the first and second detection members during a still further stage of operation.
Figure 6B:
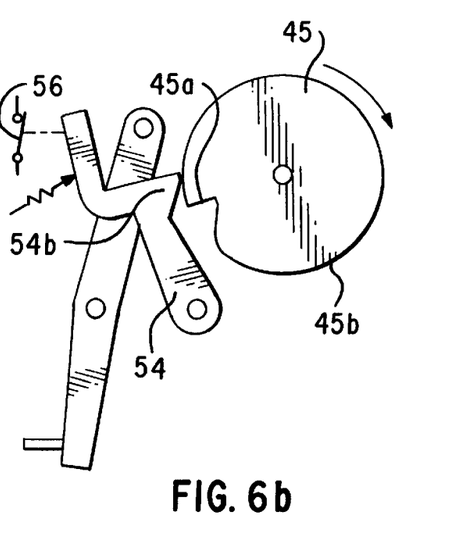
Figure 7A:
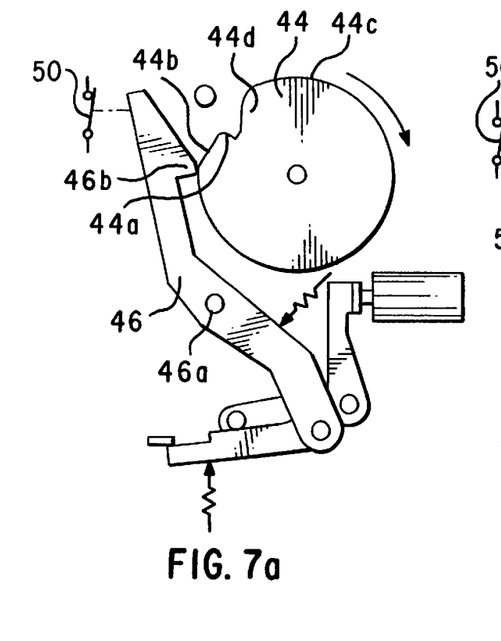
FIGS. 7(a)–(b) are schematic views of the first and second detection members during another stage of operation.
Figure 7B:
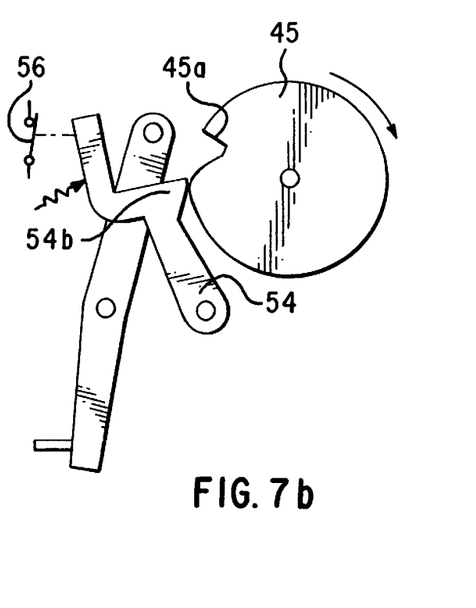

FIG. 6(a) describes a condition immediately before the completion of winding one frame of film wherein the key 46b moves along the cam portion 44d, causing the switch 50 to turn off in the process (time t8). Upon detection of the off state of the switch 50, the second motor 34 is switched to pulse driving to reduce its rotational velocity, which causes a deceleration of the film advancement speed. Upon completion of winding one frame, the condition described in FIG. 3(b) is restored wherein the key 54b enters the notch 45a and the switch 56 is turned off (time t10). Upon detection of the off state of switch 56, the second motor 34 is stopped by application of short circuit control. Simultaneously, the key 46b contacts the key unit 44a thereby preventing further rotation of the control plate 44. Thus, film advancement is stopped.

This completes the charging of the shutter and the mirror system as well as the winding of one frame of the film, and the shooting preparation condition described in FIG. 1 is restored.

Figure 12:
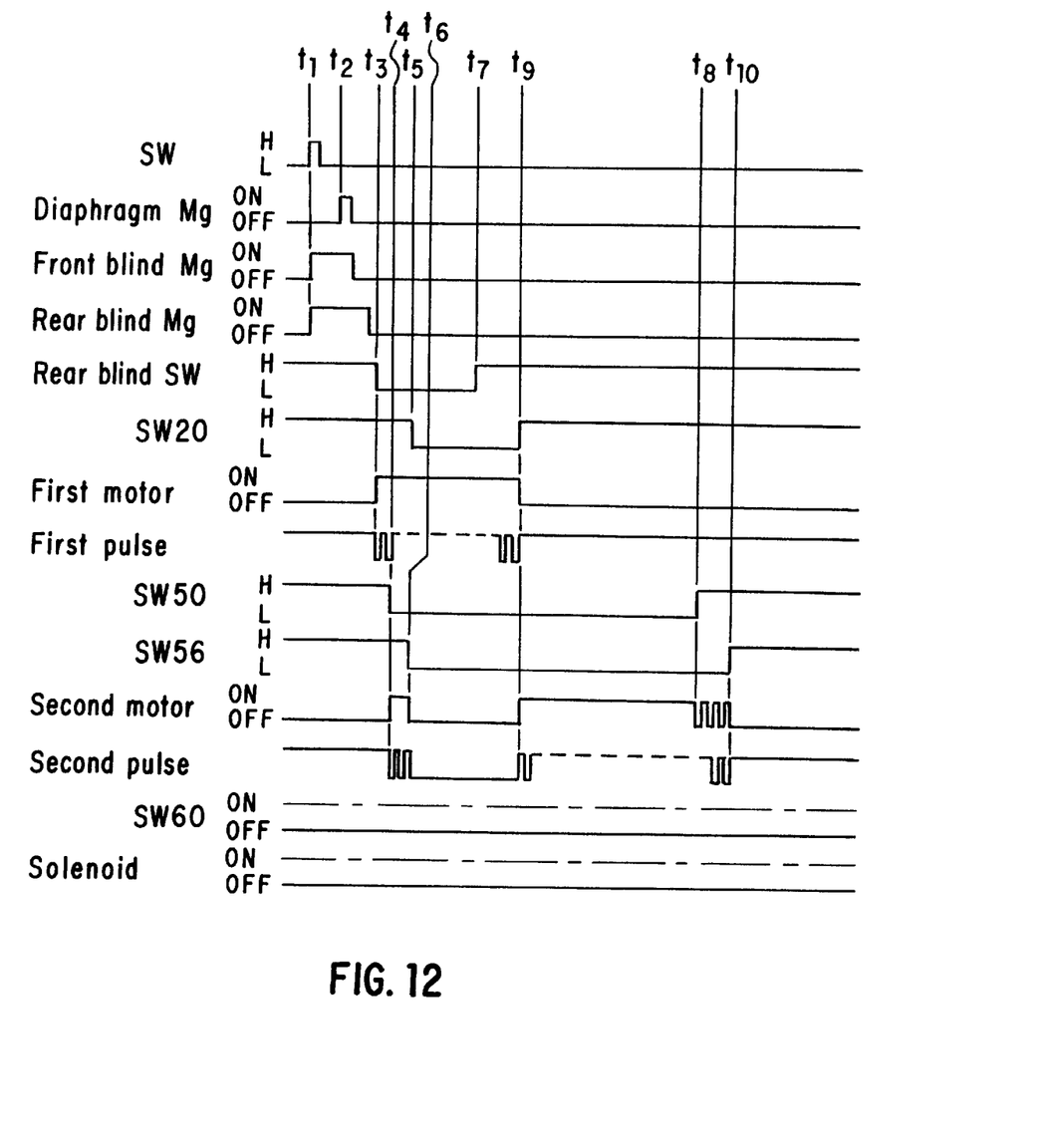
FIG. 12 is a timing chart describing a second mode of operation of the embodiment of FIG. 1.

The second mode of operation in which film winding is executed after mechanism charging is described with reference to FIG. 1, FIGS. 3(a)–7(b), and FIG. 12. In FIG. 12, H represents the off-condition and L represents the on-condition of each switch.

All the previously described processes from release (time t1) to completion of exposure are performed in the same way as the first mode and therefore, an explanation thereof is omitted herein. Further, charging of the shutter and the mirror system by the first motor 3 is performed in the same manner as the first mode.

The lever 32, the lever 48, and the lever 46 interlock with counterclockwise rotation of the lever 14, releasing the mechanical engagement between the key 46b and the control plate 44, thereby turning on switch 50 (time t4). Upon detection of the on condition of switch 50, the second motor 34 begins to rotate. When the reference axle 42 begins rotating by rotation of the spool 34a, the switch 56 turns on as described in FIG. 7(b) (time t6). Upon detection of the on condition of switch 56, the second motor 34 is stopped by application of short circuit control. Thus, film advancement is stopped immediately after it starts. On the other hand, driving of the first motor 3 continues. When driving is completed (time t9), the second motor 34 begins operation again and winding of the film is resumed.

FIG. 6(a) shows a condition immediately before the completion of winding of one film frame, wherein the key 46b moves towards the cam portion 44d turning the switch 50 off in the process (time t8). Upon detection of the off condition, driving of the second motor 34 is switched to pulse driving to reduce its rotational velocity. Consequently, the film advancement speed is also reduced. When winding of one frame is completed, the condition described in FIG. 3(b) is restored, and the key 54b enters the notch 45a, causing the switch 56 to turn off (time t10). Upon detection of the off condition of switch 56, the second motor 34 is stopped by application of short circuit control. At the same time, the key 46b contacts the stop 44a to prevent further rotation of the control plate 44. Thus, film advancement is stopped.

This concludes the winding of one film frame after completion of charging the shutter and the mirror system, and the shooting preparation condition described in FIG. 1 is restored.

Figure 13:
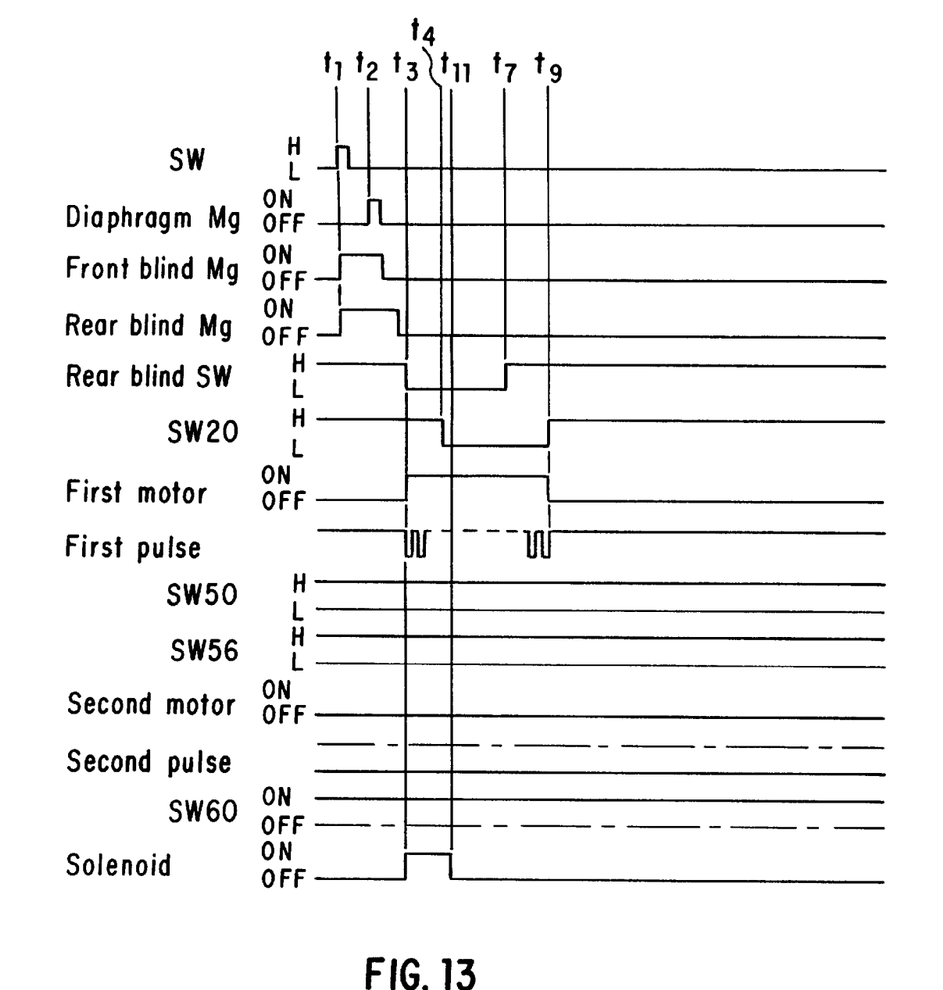
FIG. 13 is a timing chart describing a multiple exposure operation of the embodiment of FIG. 1.

Next, a multiple exposure operation is explained using FIG. 1, FIGS. 8(a)–9(b), and FIG. 13. In FIG. 13, H represents the off-condition and L represents the on-condition of each switch.

Multiple exposure of a film frame is accomplished by executing the release operation after pushing the multiple exposure button 59. Thus, the switch 60 is turned on prior to the release operation. The processes from release (time t1) to completion of exposure are performed in the same manner as the first mode, therefore an explanation thereof is omitted herein.

Figure 8A:
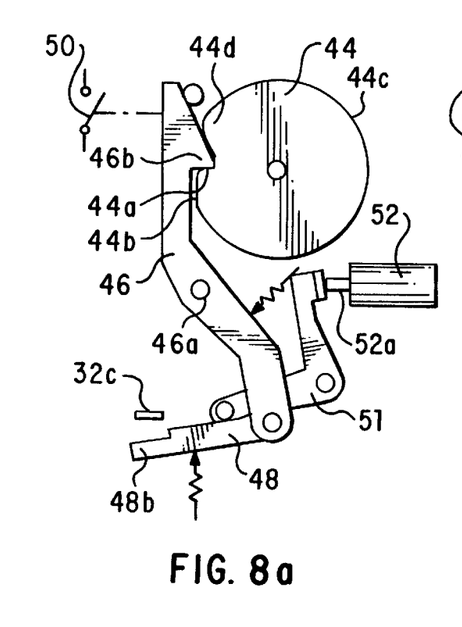
FIGS. 8(a)–(b) are schematic views of the first and second detection members during a mutliple exposure operation.
Figure 8B:
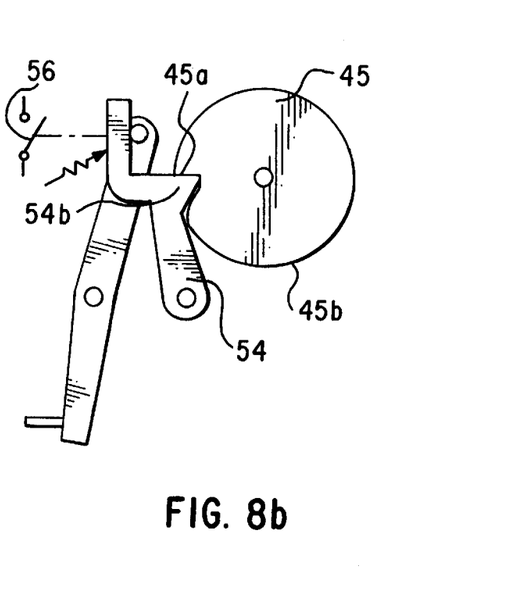
Figures 9A, 9B:
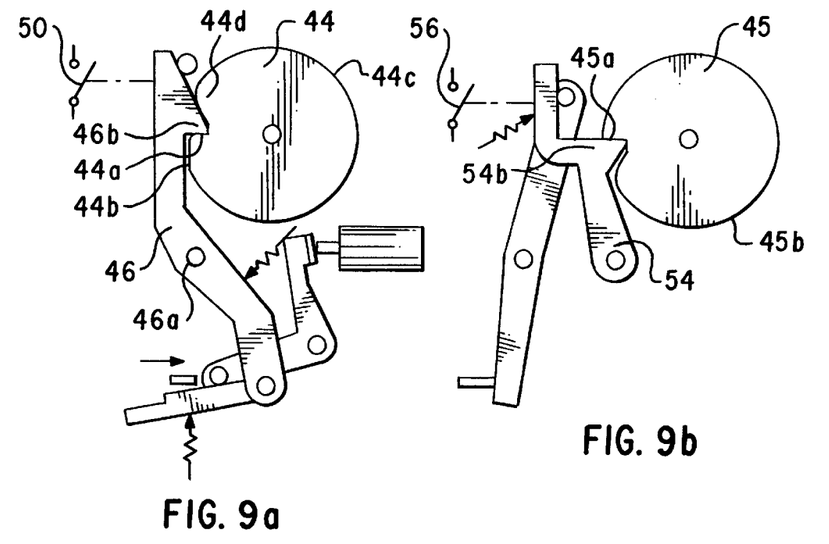
FIGS. 9(a)–(b) are schematic views of the first and second detection members during a further stage of the multiple exposure operation.
Figures 10A, 10B:
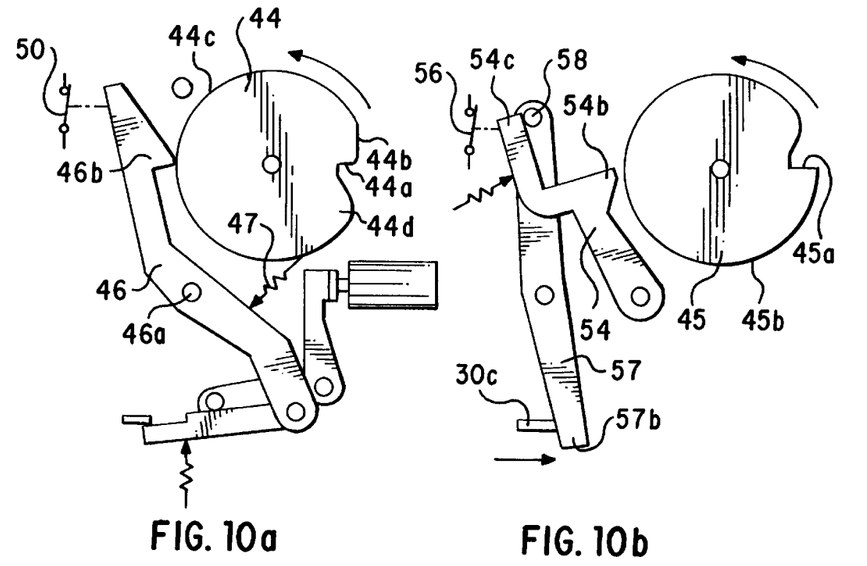
FIGS. 10(a)–(b) are schematic views of the first and second detection members during a rewinding operation.

Upon completion of the shutter operation, the shutter rear blind switch is turned on (time t3) which generates a signal that turns on the first motor 3. Simultaneously, current is sent to the solenoid 52. As shown in FIG. 8(a), the iron core 52a of the solenoid 52 rotates the lever 51 counterclockwise which in turn rotates the lever 48 counterclockwise to release engagement of lever 32.

Charging of the shutter and the mirror system by the first motor 3 is accomplished in the same manner as the first mode, hence an explanation thereof is omitted herein. The lever 32 interlocks with the counterclockwise rotation of the lever 14, but the lever 46 does not interlock with the lever 32 since their engagement is released as described in FIG. 9(a). Thus, the engagement of the key 46b and the control plate 44 is not released. Consequently, the switch 50 is not turned on, the second motor 34 is not started, and the winding of the film is not executed. The supply of electric current to the solenoid 52 is terminated at time t11 with the elapsing of a specified time after the start of the supply of current thereto. This period of time is longer than the time needed for the first motor 3 to cause the top portion 32c of the lever 32 to reach a position where it cannot engage with the end portion 48b of the lever 48.

The above sequence only completes charging of the shutter and the mirror system. Therefore, the next release operation causes re-exposure of the previous film frame.

Next, the rewinding operation is explained with reference to FIGS. 1–2, and FIGS. 10(a)–(b).

At the start of the rewinding operation, the push operation unit 24a of the axle 24 is pushed inward causing switch 26 to turn on and the lever 27 to rotate clockwise which in turn causes the lever 30 to rotate clockwise. The shoulder portion 30c of the lever 30 rotates the lever 57 counterclockwise which causes the pin 58 of lever 57 to rotate the lever 54 counterclockwise. This releases the engagement between the key 54b and the completion detection plate 45. Since the key 54b acts as a reverse rotation protection device for the reference axle 42, the above release removes the reverse rotation protection thus making it possible for the sprocket 40 to rotate in the direction of rewinding the film. Although the lever 46 is energized to engage the control plate 44, it does not prevent reverse rotation of the reference axle 42 since the direction of rotation of the control plate 44 during rewinding (represented by the arrow in FIG. 10(a)) prevents the stop 44a from abutting against the key 46b.

The top portion 31d of the lever 30 rotates the clutch lever 37 clockwise through the spring 39 causing the clutch gear 36 to move in the direction along its axis which disconnects the speed reducer 35 and the spool 34a. When the push operation unit 24a of the axle 24 is pushed, one end of the lever 21 engages with the groove 24b, and the axle 24 is maintained in the pushed position. Thus, release of the reverse rotation protection of the reference axle 42 and release of the interlocking of the speed reducer 35 with the spool 34a are maintained. Also, the switch 26 is maintained in the on-condition.

Next, the operation lever 69 described in FIG. 2 is rotated clockwise. This causes the interlocked lever 75 to rotate clockwise, which moves the clutch gear 64 in a direction parallel to the transmission axle 63 and causes the speed reducer 62 and the gear 65 to be connected. Also, movement of the lever 72 turns the switch 78 on. When the operation lever 69 is rotated clockwise over a specified angle, the force of the toggle spring 71 maintains the operation lever 69 in the thus rotated position. Therefore, the connection between the speed reducer 62 and the gear 65 as well as the on-condition of the switch 78 are maintained.

When both the switch 26 and the switch 78 are turned on, the third motor 61 begins to rotate. Due to the engagement of the fork-shaped bottom portion 66b with the chamber (not shown), the film is rewound. Since the reverse rotation protection of the sprocket 40 is released as explained above, rewinding of the film is not blocked. Further, since the spool 34a is disconnected from the speed reducer 35, only a slight load is imposed on the third motor 61. When most of the film is rewound in the chamber and the film detection pin 28 detects the passage of the tip portion of the film, switch 29 is turned on and causes the third motor 61 to stop by application of short circuit control. This completes rewinding of the film.

With the start of the next release operation, the first motor 3 begins driving and the cam 5 rotates until the switch 20 is turned off. At the beginning of the rotation of cam 5, the pin 23 rotates the lever 21 clockwise out of engagement with the axle 24 which causes the axle 24 to return to the position shown in FIG. 1. Thus, reverse rotation protection of the reference axle 42 by the lever 54 is again operative, and the speed reducer 35 and the spool 34a are again connected together enabling the next winding operation to occur.

Figure 14:
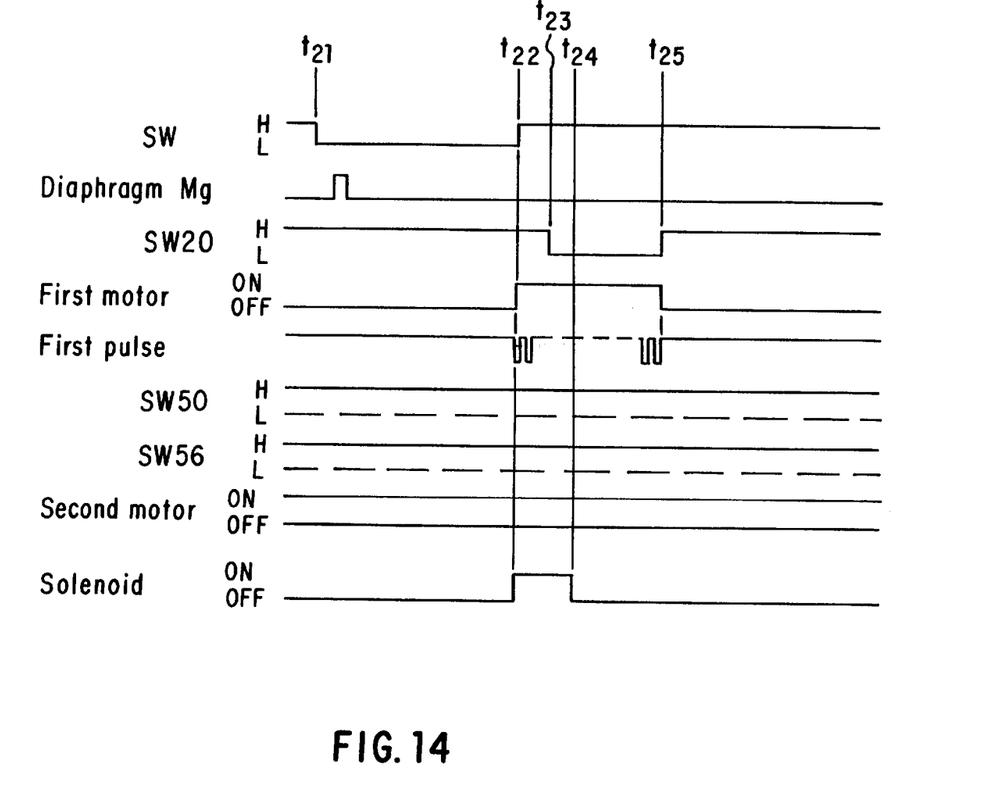
FIG. 14 is a timing chart describing a preview operation of the embodiment of FIG. 1.

Next, the preview operation to close the diaphragm of the lens to a predetermined value before shooting is explained with reference to FIGS. 1 and 14.

Pushing of preview button 80 turns the switch 81 on (time t21 in FIG. 14), the detection of which starts the closing operation of the diaphragm control device (not shown). When the diaphragm reaches a predetermined value, the diaphragm magnet begins operation and stops the closing operation. Upon release of the preview button 80, the switch 81 is turned off (time t22). The off condition of switch 81 is detected and causes the first motor 3 to start and electric current to be supplied to the solenoid 52. As in the multiple exposure operation explained above with reference to FIGS.

8(a)–9(b), the engagement of the lever 46 with the control plate 44 is not released. Therefore, film winding is not executed and only charging of the shutter 1 and the mirror system 2 are executed by the first motor 3. The switch 20 turns on (time t23) during one rotation of the cam axle 5 and turns off upon completion of one rotation (time t25). Upon detection of the off condition of the switch 20, the first motor 3 is stopped by application of short circuit control.

Since the shutter 1 is already charged, in reality, only the mirror system is charged in the above operation. Hence, the closing condition is released, and the diaphragm returns to the open condition. The electric current supplied to the solenoid 52 is terminated at time t24 with the elapsing of a specified time after the start of supplying current thereto. This period of time is longer than the time needed for the first motor 3 to cause the top portion 32c of the lever 32 to reach a position where it cannot engage the end portion 48b of the lever 48. This completes the preview operation.

With the above described embodiment of the invention, a precise film stop position and avoidance of film tears can be realized. This is accomplished by reducing the film speed prior to mechanical engagement of the film. In addition, the pulse-driving control can be simplified since the precision of the film stop position is guaranteed by the mechanical engagement. In other words, compared to the conventional system in which position control is executed without mechanical engagement, control with a high level of confidence is attained that is uneffected by voltage and surrounding temperature fluctuations, uneven film drawing force, and the like.

Moreover, by switching the phase of the interlocking switch of the reverse rotation protection device against the rotation of the reference axle, a special reference axle phase detection device is not needed to change driving control for the film winding motor. Likewise, by switching the phase of the interlocking switch for the winding rotation restriction device against the rotation of the reference axle, a special reference axle phase detection device is not needed to temporarily stop the film winding motor.

In addition, since the winding restriction device is released directly by power from the mechanism charge motor and the solenoid operates only during the multiple exposure and preview operations, the supply of electricity to the solenoid is normally not needed. Consequently, unnecessary battery consumption can be avoided. Moreover, even if the iron core of the solenoid is moved due to an undesired impact on the camera, the winding restriction member is not released. Therefore, wasting of film does not occur.

By energizing the winding restriction member in the direction of engagement, the winding restriction member complies with the reverse rotation of the reference axle. Consequently, releasing of the winding restriction member during rewinding is unnecessary, thus eliminating the use of interlocking parts and increasing reliability.

As explained above, the motor is driven with a first speed from the time of the first phase detection to the third phase detection and the motor is driven with a second speed, which is slower than the first speed, from the time of the third phase detection to the fourth phase detection. With such an arrangement, application of a large force to the film is avoided and film tears during low temperature conditions are prevented.

Because the restriction member is located in the first position during the first and second phases, the control device drives the first motor continuously during the time period between the first and fourth phases if the first mode is selected. Further, if the second mode is selected, the control device stops the first motor after driving during the time period between the first and second phases and drives the first motor again after a predetermined period of time has elapsed until the fourth phase is detected. Hence, accurate operation is realized, preventing erroneous operation due to impact, saving space and costs, and enabling reduction in battery consumption.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A power drive device, comprising:
   a motor;
   a control device coupled to the motor;
   a rotatable reference axle member rotatably interlocked with the rotation of the motor;
   a movable reference member in selective engagement with the reference axle member, the restriction member being movable to a first position to prevent rotation of the reference axle member and to a second position to permit rotation of the reference axle member;
   a movable reverse rotation prevention member in selective engagement with the reference axle member, the reverse rotation member being movable to a first position to prevent reverse rotation of the reference axle member and to a second position to permit reverse rotation of the reference axle member;
   a first detection member that detects a first phase and a third phase of rotation of the reference axle member, the first phase corresponding to a rotation starting position of the reference axle member and the third phase corresponding to a near completion position of the reference axle member; and
   a second detection member that detects a second phase and a fourth phase of rotation of the reference axle member, the fourth phase of rotation corresponding to a rotation completion position of the reference axle member, wherein the control device drives the motor in accordance with the detected phases of the first and second detection members, the first detection member is interlockable with the restriction member, and the second detection member is interlockable with the reverse rotation prevention member.

2. The power drive device according to claim 1, wherein the control device drives the motor with a first velocity during the time period between the detection of the first and third phases and drives the motor with a second velocity during the time period between the detection of the third and fourth phases.

3. The power drive device according to claim 2, wherein the motor is pulse-driven during the time period between the detection of the third and fourth phases.

4. The power drive device according to claim 2, wherein the second velocity is less than the first velocity.

5. A film winding device comprising the power drive device according to claim 1, wherein the film device is driven by the motor of the power drive device to wind a film thereon and further comprises a film sprocket interlocked with the reference axle member of the power drive device.

6. The power drive device according to claim 17, wherein if the first mode is selected, the control device drives the first-mentioned motor with a first velocity during the time period between the detection of the first and third phases and drives the first-mentioned motor with a second velocity which is slower than the first velocity during the time period between the detection of the third and fourth phases.

7. The power drive device according to claim 17, wherein if the second mode is selected, the control device drives the first-mentioned motor with a first velocity during a portion of the time period between the detection of the second and third phases and drives the first-mentioned motor with a second velocity which is slower than the first velocity during the time period between the detection of the third and fourth phases.

8. A film winding device comprising the power drive device according to claim 17, wherein the film device is driven by the first-mentioned motor of the power drive device to wind a film thereon and further comprises a film sprocket interlocked with the reference axle member of the power drive device.

9. The film winding device of claim 8, further comprising a shutter, wherein the power drive device charges the shutter.

10. A power drive device, comprising:
a motor;
control means for controlling the motor;
reference means rotatably interlocked with the rotation of the motor;
movable restriction means for selectively engaging the reference means, the restriction means being movable to a first position to prevent rotation of the reference means and to a second position to permit rotation of the reference means;
movable reverse rotation prevention means selectively engaging the reference means, the reverse rotation prevention means being movable to a first position to prevent reverse rotation of the reference means and to a second position to permit reverse rotation of the reference means;
first detection means for detecting a first phase and a third phase of rotation of the reference means, the first phase corresponding to a rotation starting position of the reference means and the third phase corresponding to a near completion position of the reference means; and
second detection means for detecting a second phase and a fourth phase of rotation of the reference means, the fourth phase of rotation corresponding to a rotation completion position of the reference means, wherein the control means controls the motor in accordance with the detected phases of the first and second detection means, the first detection means is interlockable with the restriction means, and the second detection means is interlockable with the reverse rotation prevention means.

11. The power drive device according to claim 10, wherein the control means drives the motor with a first velocity during the time period between the detection of the first and third phases and drives the motor with a second velocity during the time period between the detection of the third and fourth phases.

12. The power drive device according to claim 11, wherein the motor is pulse-driven during the time period between the detection of the third and fourth phases.

13. The power drive device according to claim 11, wherein the second velocity is less than the first velocity.

14. A film winding device comprising the power drive device according to claim 10, wherein the film winding device is driven by the motor of the power drive device to wind a film thereon and further comprises a film sprocket interlocked with the reference means of the power drive device.

15. The power drive device according to claim 19, wherein if the first mode is selected, the control means drives the first-mentioned motor with a first velocity during the time period between the detection of the first and third phases and drives the first-mentioned motor with a second velocity which is slower than the first velocity during the time period between the detection of the third and fourth phases.

16. The power drive device according to claim 19, wherein if the second mode is selected, the control means drives the first-mentioned motor with a first velocity during a portion of the time period between the detection of the second and third phases and drives the first-mentioned motor with a second velocity which is slower than the first velocity during the time period between the detection of the third and fourth phases.

17. A power drive device, comprising:
a motor;
a second motor;
a control device coupled to the motor;
a mode selector that selects between a first mode in which both said motors are driven substantially simultaneously and a second mode in which the first-mentioned motor is driven substantially when said second motor is stopped;
a rotatable reference axle member rotatably interlocked with the rotation of the motor;
a first detection member that detects a first phase and a third phase of rotation of the reference axle member, the first phase corresponding to a rotation starting position of the reference axle member and the third phase corresponding to a near completion position of the reference axle member; and
a second detection member that detects a second phase and a fourth phase of rotation of the reference axle member, the fourth phase of rotation corresponding to a rotation completion position of the reference axle member, wherein the control device drives the first-mentioned motor in accordance with the detected phases of the first and second detection members, the control device drives the first-mentioned motor continuously during the time period between the first and fourth phases if the first mode is selected and if the second mode is selected, the control device drives the first-mentioned motor during the time period between the first and second phases and then stops the first-mentioned motor for a predetermined period of time and then resumes driving of the first-mentioned motor until the fourth phase is detected.

18. A power drive device, comprising:
a motor;
a second motor;
a control device coupled to the motor;
a mode selector that selects between a first mode in which both said motors are driven substantially simultaneously and a second mode in which the first-mentioned motor is driven substantially when said second motor is stopped;
a rotatable reference axle member rotatably interlocked with the rotation of the motor;
a first detection member that detects a first phase and a third phase of rotation of the reference axle member, the first phase corresponding to a rotation starting position of the reference axle member and the third phase corresponding to a near completion position of the reference axle member; and a second detection member that detects a second phase and a fourth phase of rotation of the reference axle member, the fourth phase of rotation corresponding to a rotation completion position of the reference axle member, wherein the control device drives the motor in accordance with the detected phases of the first and second detection members and if the second mode is selected, the control device drives the first-mentioned motor with a first velocity during a portion of the time period between the detection of the second and third phases and drives the first-mentioned motor with a second velocity which is slower than the first velocity during the time period between the detection of the third and fourth phases.

19. A power drive device, comprising:

a motor;

a second motor;

control means for controlling the motor;

a mode selector means for selecting between a first mode in which both said motors are driven substantially simultaneously and a second mode in which the first-mentioned motor is driven substantially when the second motor is stopped;

reference means rotatably interlocked with the rotation of the motor;

first detection means for detecting a first phase and a third phase of rotation of the reference means, the first phase corresponding to a rotation starting position of the reference means and the third phase corresponding to a near completion position of the reference means;

second detection means for detecting a second phase and a fourth phase of rotation of the reference means, the fourth phase of rotation corresponding to a rotation completion position of the reference means;

movable restriction means for selectively engaging the reference means, the restriction means being movable to a first position to prevent rotation of the reference means and to a second position to permit rotation of the reference means; and movable reverse rotation prevention means selectively engaging the reference means, the reverse rotation prevention means being movable to a first position to prevent reverse rotation of the reference means and to a second position to permit reverse rotation of the reference means, wherein the control means controls the motor in accordance with the detected phases of the first and second detection means, the first detection means is interlockable with the restriction means, and the second detection means is interlockable with the reverse rotation prevention means.

20. A power drive device, comprising:

a motor;

a second motor;

control means for controlling the motor;

a mode selector means for selecting between a first mode in which both said motors are driven substantially simultaneously and a second mode in which the first-mentioned motor is driven substantially when the second motor is stopped;

reference means rotatably interlocked with the rotation of the motor;

first detection means for detecting a first phase and a third phase of rotation of the reference means, the first phase corresponding to a rotation starting position of the reference means and the third phase corresponding to a near completion position of the reference means; and second detection means for detecting a second phase and a fourth phase of rotation of the reference means, the fourth phase of rotation corresponding to a rotation completion position of the reference means, wherein the control means controls the motor in accordance with the detected phases of the first and second detection means, the control means drives the first-mentioned motor continuously during the time period between the first and fourth phases if the first mode is selected, and if the second mode is selected the control means drives the first-mentioned motor during the time period between the first and second phases and then stops the first-mentioned motor for a predetermined period of time and then resumes driving of the first-mentioned motor until the fourth phase is detected.

* * * * *